United States Patent [19]

Mast

[11] 4,041,493
[45] Aug. 9, 1977

[54] ELIMINATION OF EXTRANEOUS MODULATION FROM VHF OMNIRANGE RECEIVER

[75] Inventor: John G. Mast, Irving, Tex.

[73] Assignee: Textron, Inc., Providence, R.I.

[21] Appl. No.: 629,968

[22] Filed: Nov. 7, 1975

[51] Int. Cl.² .............................................. G02S 1/44
[52] U.S. Cl. ................................. 343/106 R; 325/476
[58] Field of Search .................... 343/106 R; 325/476

[56] References Cited

U.S. PATENT DOCUMENTS

| 3,653,047 | 3/1972 | Anthony | 343/106 R |
| 3,763,491 | 10/1973 | Ishman | 343/106 R |
| 3,868,577 | 2/1975 | Watt | 325/476 |
| 3,870,996 | 3/1975 | Miller | 325/476 |

Primary Examiner—Maynard R. Wilbur
Assistant Examiner—T. M. Blum
Attorney, Agent, or Firm—Richards, Harris & Medlock

[57] ABSTRACT

A VHF omnirange receiver subject to extraneous amplitude modulation of the carrier close to the frequency of a variable phase VOR modulation signal with a subcarrier frequency modulated by a fixed phase signal at the frequency of the variable phase signal is adapted for elimination of the effect of the extraneous modulation. Amplitude modulation of the subcarrier is detected and amplified with phase reversal with amplification in an amount equal to the ratio of the carrier amplitude to the subcarrier amplitude to produce a cancellation signal. The cancellation signal is added to the composite received signal to eliminate the effects of unwanted modulation at the frequency on the carrier.

9 Claims, 8 Drawing Figures

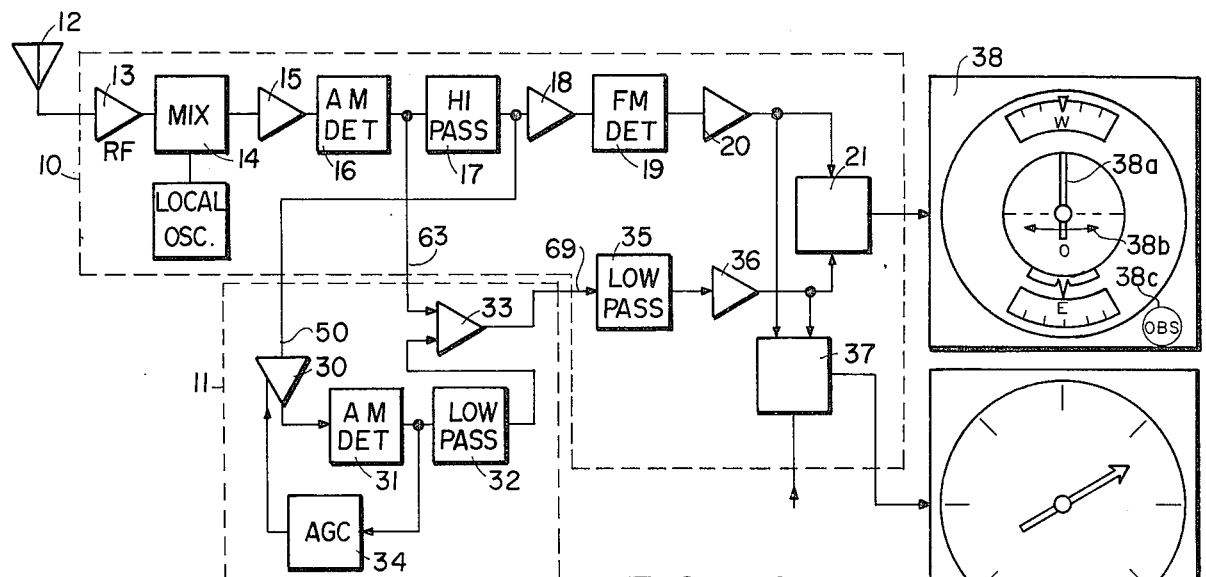
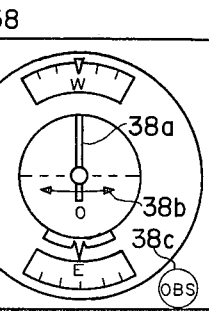
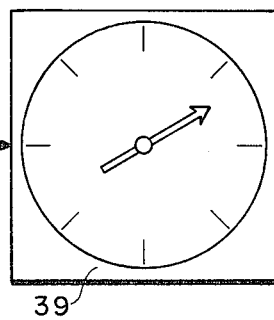
FIG. 4
FIG. 4A
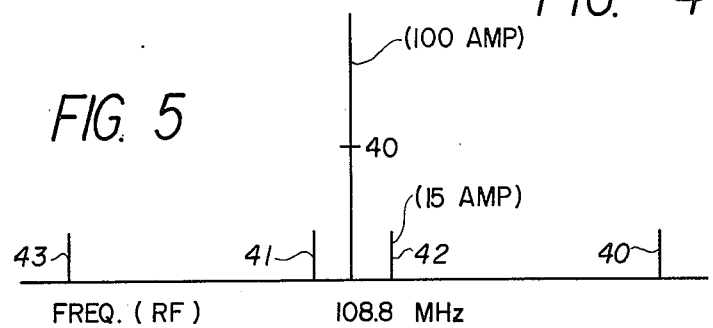
FIG. 5
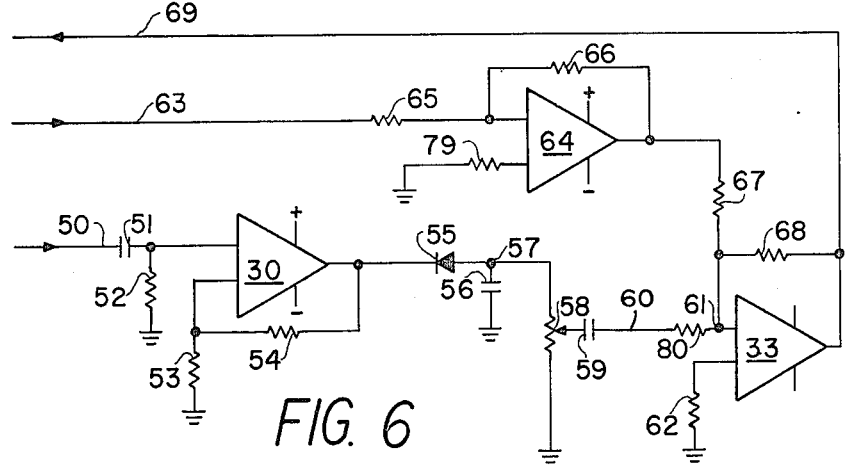
FIG. 6
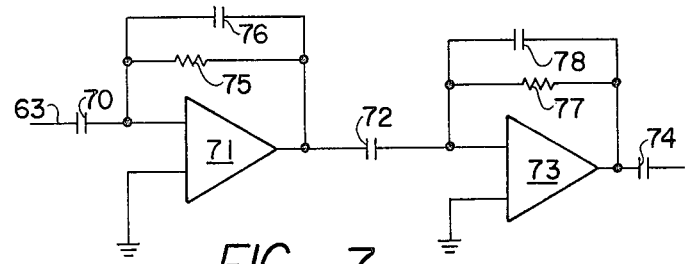
FIG. 7

ELIMINATION OF EXTRANEOUS MODULATION FROM VHF OMNIRANGE RECEIVER

This invention relates to aircraft navigation systems, and more particularly to the minimization of extraneous modulation in VOR navigation signals.

In VHF omnirange navigation systems, a ground station is provided at each of several spaced apart locations to provide bearing signals received by aircraft flying within the range of each station. Aircraft guidance systems or information displays can be energized in response to such signals to permit the aircraft to fly to a station or at a selected heading from a station. Such VHF omnirange stations transmit an RF carrier that is amplitude modulated by a 30 Hz variable phase signal. The phase of the 30 Hz signal signifies a selected azimuth. A subcarrier, normally of 9960 Hz in the United States, amplitude modulates the carrier and is frequency modulated by a 30 Hz constant phase signal which provides phase reference.

At the receiver in the aircraft, the RF carrier thus modulated is received. The 30 Hz reference FM modulation signal is detected from the subcarrier. The 30 Hz variable phase amplitude modulation of the main carrier is detected. The two signals are then compared and the phase difference is representative of the magnetic bearing of the aircraft relative to the ground station.

The present invention is particularly useful in connection with aircraft VOR receivers in helicopters. Helicopter main rotors often operate at an R.P.M. such that a significant harmonic of the blade passage rate occurs at or near the 30 Hz frequency. The blade passage modulates the carrier with amplitude modulation the same as, and thus indistinguishable from, the 30 Hz variable phase modulation signal. The present invention is directed toward the elimination of the effect of modulation due to the rotor.

The aircraft rotor has been found to modulate the subcarrier as well as the RF carrier. In accordance with the invention, circuit means are provided to detect this amplitude modulation of the subcarrier. The detected signal is then amplified by an amount equal to the ratio of the carrier and subcarrier amplitudes and is reversed in phase to produce a cancellation signal. The cancellation signal is then added to the composite demodulation from the carrier thereby to cancel the effect of the rotor modulation on the AM modulation component.

While in the particular operation here discussed the unwanted modulation is due to the rotor, the invention is applicable to eliminating the effects of any unwanted modulation so long as it amplitude modulates both carrier and the subcarrier by the same relative amount. The frequency of the unwanted modulation signal may vary. It becomes of consequence only when it is very close to the 30 Hz variable phase information signal, i.e., within approximately B1.5 Hz. If the frequency of the unwanted modulation is within that range, it will be canceled in accordance with the present invention. If it falls outside that range, it can be discriminated against in accordance with known techniques. If it is not discriminated against by such known techniques, then it will be eliminated in the operation of the present invention.

In accordance with the invention a VHF omnirange receiver responds to extraneous amplitude modulation of a carrier when the extraneous modulation is close to the frequency of a variable phase VOR modulation signal. A subcarrier is frequency modulated by a fixed phase signal at the frequency of said variable phase signal. Means are provided to detect amplitude modulation of the subcarrier.

The detected signal is amplified with phase reversal by an amount equal to the ratio of the carrier amplitude to the subcarrier amplitude to produce a cancellation signal which is added to the composite amplitude demodulation product of the carrier to eliminate the effects of unwanted amplitude modulation.

The novel features believed characteristics of the invention are set forth in the appended claims. The invention itself, however, as well as further objects and advantages thereof, will best be understood by reference to the following detailed description of an illustrative embodiment taken in conjunction with the accompanying drawings, in which:

FIG. 4 is a block diagram of a VHF omnirange receiver system in which the present invention is embodied;

FIG. 4a illustrates the display involved without the present invention;

FIG. 5 is a graph of the RF spectrum involved in the present case;

FIG. 6 is a circuit diagram of a portion of the circuit of FIG. 4; and

FIG. 7 illustrates in further detail a modification of a portion of the circuit of FIG. 6.

Figure 1:
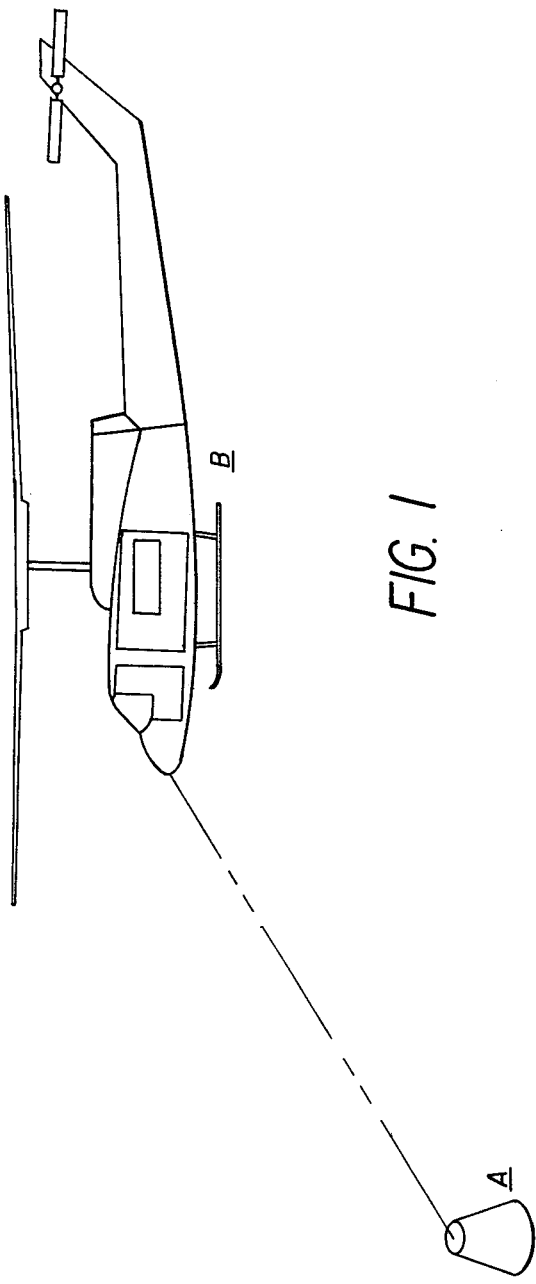
FIG. 1 illustrates an aircraft receiving a signal from an omnirange station.
Figure 3:
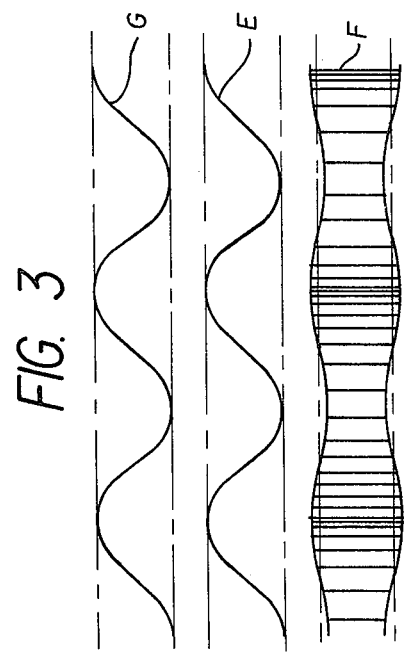
FIG. 3 illustrates the combined effects of desired FM modulation and undesired AM modulation on an omnirange subcarrier signal.
Figure 2:
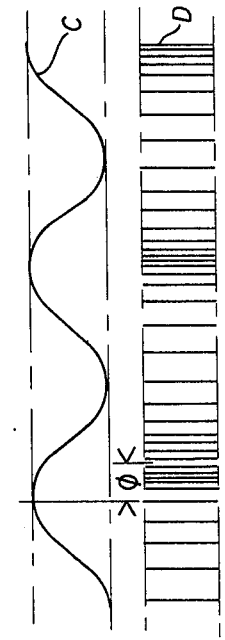
FIG. 2 illustrates elimination of the unwanted modulation in accordance with the present invention.

Referring now to FIG. 1, a VHF omnirange transmitting station A is provided for the transmission of signals to be received by aircraft within its range such as the helicopter B. Station A transmits an RF carrier amplitude modulated by two signals. The first is a 30 Hz variable phase signal C. The second signal modulating the RF carrier is a 9960 Hz subcarrier. The subcarrier D, FIG. 2, is frequency modulated by a 30 Hz signal represented by the varying spacing of signal D. This is a constant phase signal to provide a phase reference. The phase difference $\phi$ illustrated is representative of the bearing of the aircraft relative to the ground station. However, it has been found that motion of a helicopter blade often amplitude modulates both the RF carrier and the subcarrier D by a wave E which may be in the range of 29.4 Hz to 30.0 Hz so that subcarrier D is both FM modulated and AM modulated. The present invention serves to eliminate the effects of such rotor modulation represented by waveform E. The result is as shown in FIG. 3 where the waveform E has the effect of amplitude modulation only on the subcarrier D resulting in waveform F. The rotor modulation by waveform E of the RF carrier results in waveform G, which is the sum of C and E.

Referring now to FIG. 4, an embodiment of the invention is shown where the system includes a VOR receiver 10 and a modulation cancellation device 11. The VOR receiver 10 receives a signal from an antenna 12 and passes the signal through a RF amplifier 13, a mixer 14, an IF amplifier 15 and then to an AM detector 16. A high-pass filter 17 at the output of detector 16 passes a signal to an amplifier 18 whose output is applied by way of an FM detector 19 and an amplifier 20 to a phase detector 21. Normally the signal detected by antenna 12 comprises an RF carrier at an assigned frequency to the VOR navigation band of from 108 to 118 MHz. The carrier is amplitude modulated by a 30 Hz variable phase signal. The RF carrier is also amplitude modulated by a 9960 Hz subcarrier. The 9960 Hz subcarrier is frequency modulated by a 30 Hz constant phase reference signal.

The detector 16 and high-pass filter 17 thus serve to apply the 9960 Hz subcarrier to amplifier 18. The FM detector 19 provides a 30 Hz constant phase reference signal to amplifier 20 and thence to the phase detector 21.

In accordance with the present invention, the AM modulation of the subcarrier is sensed, amplified and added with phase reversal to the composite signal received by the antenna. More particularly, the output of the high-pass filter 17 is connected to a gain controlled amplifier 30 the output of which is applied to an amplitude modulation detector 31. The signal from detector 31 is then applied by way of a low-pass filter 32 to the inverting input of a summing amplifier 33. An AGC circuit 34 provides for control of the gain of amplifier 30.

The second input to amplifier 33 is supplied by the output of the detector 16 which is the 30 Hz variable phase amplitude modulation of the carrier.

The amplification from line 50 to line 69 is equal to the ratio of the carrier and subcarrier amplitudes. Normally, in VOR systems, the subcarrier is controlled as to have an amplitude equal to 0.3 times the amplitude of the carrier. In such case, the gain including the amplifiers 30 and 33 would be 3.33. This is because the unwanted extraneous amplitude modulation constitutes the same percentage of the carrier as it does of the subcarrier. More particularly, as shown in FIG. 5, the spectrum of the transmitted signal is indicated with the carrier represented by line 40. Carrier 40 is to modulated to 30% by the 30 cycle variable phase signal which is represented by the lines 41 and 42 each having an amplitude 15% of the amplitude of the carrier 40.

Similarly, the subcarrier modulates carrier 40 by 30% as indicated by the lines 43 and 44. Lines 43 and 44 are 15% of the amplitude of line 40. The AM modulation due to the rotor will thus modulate the carrier 40 by the same percentage that it modulates the subcarrier represented by lines 43 and 44. The amplification in the loop of amplifiers 30 and 33 thus detects the unwanted AM modulation of the subcarrier and restores it to the same level as the AM modulation on the carrier. Thus, at the output of amplifier 33, the effects of the unwanted modulation are canceled due to the phase inversion of the signal derived from filter 32 relative to the signal derived from detector 16. The output is then applied by way of a low-pass filter 35 and thence through an amplifier 36 to the phase detecting circuit 21 as well as to an automatic bearing display circuit 37.

Referring again to FIG. 4, it will be noted that the omni display unit 38 comprises a needle 38a pivoted at the upper end as to swing through an arc represented by arrows 38b to portray VOR course deviation. VOR bearing is displayed on unit 39. As long as the aircraft is on the selected omni bearing, the needle 38a will be centered on the display. Knob 38c is an omni bearing selector so that the pilot can select a desired heading and then fly the needle 38a to that heading.

As illustrated in FIG. 4a, needle 38a in the presence of unwanted modulation due to the rotor oscillates in the manner represented by the dotted outlines in FIG. 4a. The oscillation is such that the display essentially becomes useless. However, by utilization of the cancellation circuit 11, the needle 38a becomes stable and the readings thereof reliable.

In FIG. 6 a circuit has been shown for use in the modulation cancellation unit 11. The amplifier 30 is supplied with a signal by way of line 50 and capacitor 51. The input is shunted to ground by resistor 52. The second input is shunted to ground by way of resistor 53 with a feedback resistor 54 connected around amplifier 30. The line 50 is the output line leading from the high-pass filter 17 of FIG. 4. The output of amplifier 30 is amplitude detected by a detector comprising diode 55 and capacitor 56. The output signal at the node 57 is then connected to ground by way of a potentiometer 58. The magnitude of the detected signal is then controlled by the setting of the potentiometer 58. The detected signal is applied by way of condenser 59 to node 60 and to an input terminal 61 of the summing amplifier 33. The second input terminal of amplifier 33 is connected to ground by way of resistor 62.

The output from the amplitude detector 16 of FIG. 4 is connected by way of line 63 to a phase inverting amplifier 64. The signal is applied to amplifier 64 by way of a resistor 65. Amplifier 64 is shunted by resistor 66. Resistor 65 and 66 are of the same amplitude so that amplifier 64 has unit gain. The output thereof is applied by way of resistor 67 to the summing point 61. The value of resistor 80 is chosen so the gain from line 50 to line 69 may be set by potentiometer 58 to any value from zero to approximately 4.0. Resistors 67 and 68 are also of the same value so that the signal on line 69 is equal to the signal on line 63 minus the signal at node 60. Thus, the outut of amplifier 33 is available as the product of the modulation cancellation device 11 and is applied by way of line 69 to the input of low-pass filter 35 of FIG. 4.

In one embodiment, the circuit of FIG. 6 comprises amplifiers 30 and 33 of type 747 and amplifier 64 of type 741 operating with the following circuit parameters:

| | |
|---|---|
| Capacitor 51 | .01 microfarads |
| Resistors 52, 62, 79 | 100 k ohms |
| Resistor 53 | 10 k ohms |
| Resistor 54 | 22 k ohms |
| Diode 55 | 1N82 |
| Capacitor 56 | .004 microfarads |
| Potentiometer 58 | 50 k ohms |
| Capacitor 59 | 47 microfarads |
| Resistors 65, 66, 67, 68 | 200 k ohms |

In the circuit of FIG. 4, it will be noted that the three lines 50, 63 and 69 serve to interconnect the modulation cancellation unit 11 to the receiver 10. Where it is desired that there be minimum disturbance of the receiver 10, a two wire modulation cancellation device can be provided by utilizing the circuit of FIG. 7 in place of the circuit of amplifier 30 of FIG. 6. More particularly, in FIG. 7 the circuit forms a combined amplifier and high-pass filter. The circuit would be connected to the same input line as amplifier 64 of FIG. 6. Amplifier 64 remains connected as in FIG. 6. Thus, line 50 of FIG. 6 would not be employed and only lines 63 and 69 would extend between the modulation cancellation device 11 and the receiver 10.

In FIG. 7, line 63 is connected through a capacitor 70 to an amplifier 71, the output of which is connected by way of capacitor 72 to an amplifier 73 whose output is connected by way of capacitor 74 to a suitable amplitude demodulation circuit. Amplifiers 71 and 73 have the second input terminals connected to ground. Amplifier 70 is shunted by way of resistor 75 and capacitor 76. Amplifier 73 is shunted by resistor 77 and capacitor 78. With the circuit parameters set out below, the circuit of FIG. 7 served the dual function of an amplifier and high-pass filter, the high-pass filter serving the same function as high-pass filter 17 of FIG. 4 in providing a signal to the modulation cancellation circuit. The parameters of FIG. 7 in one embodiment were as follows:

| | |
|---|---|
| Amplifiers 71 and 73 | Type 747 |
| Capacitor 70 | 100 picofarads |
| Capacitor 72 | 680 picofarads |
| Capacitor 74 | .1 microfarads |
| Resistor 75 | 1 megohm |
| Capacitor 76 | 50 picofarads |
| Resistor 77 | 1 megohm |
| Capacitor 78 | 180 picofarads |

The invention has distinct advantageous properties. It is not dependent on some minimum spacing between extraneous modulation and 30 Hertz VOR modulation. It does not increase response time of the VOR receiver. It is applicable to forms of extraneous modulation other than from a helicopter rotor.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a VHF omnirange receiver intercepting a VOR transmission signal wherein extraneous amplitude modulation of the carrier occurs close to the frequency of a variable phase VOR modulation signal and a subcarrier is frequency modulated by a fixed phase signal at the frequecny of said variable phase signal, the combination which comprises:
    a. means to detect amplitude modulation of said subcarrier,
    b. means to amplify with phase reversal the detected modulation signal, the amplification being by an amount equal to the ratio of the carrier amplitude to the subcarrier amplitude to produce a cancellation signal, and
    c. means for adding said cancellation signal to said transmission signal to eliminate the effects of said extraneous amplitude modulation at said frequency on said carrier.

2. The combination of claim 1 wherein said VOR modulation signal is 30 Hertz variable in phase.

3. The combination of claim 2 wherein said subcarrier is frequency modulated by a 30 Hertz fixed phase signal.

4. In a VHF omnirange receiver intercepting a VOR transmission signal wherein extraneous amplitude modulation of the carrier occurs close to the frequency of a variable phase VOR modulation signal and a subcarrier is frequency modulated by a fixed phase signal at the frequency of said variable phase signal, the combination which comprises:
    a. means to detect a first amplitude modulation signal of said subcarrier and a second amplitude modulation signal of said carrier,
    b. means to amplify with phase reversal said first amplitude modulation signal to produce a cancellation signal, and
    c. means for adding said cancellation signal to said second amplitude modulation signal to eliminate the effects of said extraneous amplitude modulation at said frequency on said carrier.

5. In a helicopter VHF omnirange receiver where rotor rotation produces extraneous amplitude modulation of the carrier of a VOR transmission signal close to the frequency of a variable phase VOR modulation signal, and a subcarrier of said transmission signal is frequency modulated by a fixed phase signal at the frequency of said variable phase signal, the combination which comprises:
    a. means to detect amplitude modulation of said subcarrier,
    b. means to amplify with phase reversal the detected modulation signal to produce a cancellation signal equal to amplitude modulation of said carrier due to said rotor rotation, and
    c. means for adding said cancellation signal to said transmission signal to eliminate the effects of said extraneous amplitude modulation at said frequency on said carrier.

6. The method of eliminating extraneous amplitude modulation from a carrier of a VHF omnirange transmission signal where said extraneous amplitude modulation occurs close to the frequency to a variable phase VOR modulation signal, and wherein a subcarrier of said transmission signal is frequency modulated by a fixed phase signal at the frequency of said signal, which comprises:
    a. detecting amplitude modulation of said subcarrier,
    b. amplifying with phase reversal the detected modulation signal to produce a cancellation signal equal to amplitude modulation of said carrier due to said rotor rotation, and
    c. adding said cancellation signal to said transmission signal to eliminate the effects of said extraneous amplitude modulation at said frequency on said carrier.

7. The method of claim 6 wherein a 30 Hertz signal variable in phase amplitude modulates said carrier.

8. The method of claim 7 wherein a 30 Hertz fixed phase signal frequency modulates said subcarrier.

9. The method of eliminating the effect of extraneous amplitude modulation of a carrier of a VHF omnirange transmission signal where said extraneous amplitude modulation occurs close to the frequency of a variable phase VOR modulation signal and a subcarrier of said transmission signal is frequency modulated by a fixed phase signal at the frequency of said variable phase signal, which comprises:
    a. detecting a first amplitude modulation signal of said subcarrier,
    b. detecting a second amplitude modulation signal of said carrier,
    c. amplifying with phase reversal said first amplitude modulation signal to produce a cancellation signal, and
    d. adding said cancellation signal to said second amplitude modulation signal to eliminate the effects said extraneous amplitude modulation at said frequency on said carrier.

* * * * *